United States Patent
Ciaschi et al.

(10) Patent No.: US 6,521,332 B2
(45) Date of Patent: Feb. 18, 2003

(54) ROLLER ASSEMBLY CONTAINING EXTERNALLY HEATED ROLLER WITH CURED FLUOROCARBON RANDOM COPOLYMER OVERCOAT AND FUSER APPARATUS CONTAINING SAME

(75) Inventors: Andrew Ciaschi, Lima, NY (US); Jiann-Hsing Chen, Fairport, NY (US); Biao Tan, Rochester, NY (US); Joseph A. Pavlisko, Pittsford, NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/973,636

(22) Filed: Oct. 9, 2001

(65) Prior Publication Data

US 2002/0064644 A1 May 30, 2002

Related U.S. Application Data

(63) Continuation-in-part of application No. 09/501,459, filed on Feb. 10, 2000, now abandoned.

(51) Int. Cl.$^7$ .................................................. B23B 3/26
(52) U.S. Cl. ..................................... 428/304.4; 428/36.5
(58) Field of Search .............................. 428/304.4, 36.5, 428/319.3, 906, 421; 118/60; 427/409, 410, 407.1; 399/330

(56) References Cited

U.S. PATENT DOCUMENTS

| | | | |
|---|---|---|---|
| 4,272,179 A | 6/1981 | Seanor | 355/3 FU |
| 4,372,246 A | 2/1983 | Azar et al. | 118/60 |
| 4,637,973 A | 1/1987 | Shigeta et al. | 430/122 |
| 4,972,232 A | 11/1990 | Hoover et al. | 355/295 |
| 5,017,432 A | 5/1991 | Eddy et al. | 428/422 |
| 5,208,638 A | 5/1993 | Bujese et al. | 355/274 |
| 5,252,418 A | 10/1993 | Ishikawa et al. | 430/67 |
| 5,270,777 A | 12/1993 | Yoshida et al. | 355/290 |
| 5,402,211 A | 3/1995 | Yoshikawa | 355/285 |
| 5,559,581 A | * 9/1996 | Sugiura et al. | 399/111 |
| 5,572,275 A | 11/1996 | Jinzai | 399/331 |
| 6,061,545 A | 5/2000 | Cerrah | 399/330 |
| 6,084,622 A | * 7/2000 | Sugiura et al. | 347/170 |
| 6,113,830 A | 9/2000 | Chen et al. | 264/241 |
| 6,127,041 A | 10/2000 | Szostek et al. | 428/450 |

* cited by examiner

Primary Examiner—Tom Dunn
Assistant Examiner—Jonathan Johnson
(74) Attorney, Agent, or Firm—Lawrence P. Kessler

(57) ABSTRACT

A heater roller assembly for use with a fuser apparatus includes a housing comprising a radiation shield enclosing a radiant heat source, and a heater roller that is disposed within the housing and is externally heated by the radiant heat source. The heater roller includes a core, a base cushion layer overlying the core, and an outer layer overlying the base cushion layer. The outer layer of the heater roller includes a fluorocarbon random copolymer having subunits of

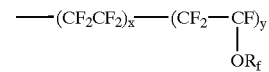

wherein x is from 10 to 90 mole %, y is from 10 to 90 mole %, x+y equal 100 mole %, and $OR_f$ is a perfluoroalkoxy group. A fuser apparatus includes a fuser roller whose outer surface is in contact with the outer layer of a heater roller included in a heater roller assembly.

35 Claims, 2 Drawing Sheets

ROLLER ASSEMBLY CONTAINING EXTERNALLY HEATED ROLLER WITH CURED FLUOROCARBON RANDOM COPOLYMER OVERCOAT AND FUSER APPARATUS CONTAINING SAME

CROSS-REFERENCE TO RELATED APPLICATIONS

This application is a Continuation-In-Part of application Ser. No. 09/501.459, filed Feb. 10, 2000 for FLUOROCARBON RANDOM COPOLYMER FOR USE IN EXTERNALLY HEATED ROLLER now abandoned, and further is related to application Ser. No. 09/500,826, filed Feb. 10, 2000 for EXTERNALLY HEATED EXTERNAL HEATER ROLLERS, the disclosure of which is incorporated herein by reference now U.S. Pat. No. 6,304,740.

FIELD OF THE INVENTION

The present invention relates to a fuser apparatus useful for heat-fixing a heat-softenable toner material to a substrate and, more particularly, to a roller assembly containing an externally heated fuser roller whose outer layer includes a cured fluorocarbon random copolymer.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. In such methods, the toner is then generally transferred to a surface of another substrate, such as, for example, a receiver sheet comprising paper or a transparent film, where i fixed in place to yield the final desired toner image.

When heat-softenable toners comprising, for example, thermoplastic polymeric binders, are employed, the usual method of fixing the toner in place involves applying heat to soften the toner that has been transferred to the receiver sheet surface, then allowing or causing the toner to cool.

One well-known fusing method entails passing the toner-bearing receiver sheet through the nip formed by a pair of opposing rolls, a heated roller, usually referred to as a fuser roller, that contacts the toner-bearing surface of the receiver sheet in order to heat and soften the toner. The other roller, usually referred to as a pressure roller, serves to press the receiver sheet into contact with the fuser roller. In some other fusing methods, the configuration is varied, with a flat plate or belt replacing the fuser roller and/or pressure roller. The description herein, while generally directed to a generally cylindrical fuser roller in combination with a generally cylindrical pressure roller, is not limited to fusing systems having members with those configurations. For that reason, the terms "fuser member" and "pressure member" are generally used herein in place of "fuser roller" and "pressure roller".

The fuser member usually comprises a rigid core covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness, often expressed as "storage modulus", and the stability of the base cushion layer are important factors in establishing and maintaining the desired area of contact.

In some previous fusing systems, it was found advantageous to vary the pressure exerted by the pressure member against the receiver sheet and fuser member. This variation in pressure can be provided, for example, in a fusing system having a pressure roller and a fuser roller, by slightly modifying the shape of the pressure roller. The variance of pressure, in the form of a gradient of pressure that changes along the direction through the nip that is parallel to the axes of the rollers, can be established by, for example, continuously varying the overall diameter of the pressure roller along the direction of its axis such that the diameter is smallest at the midpoint of the axis and largest at the ends of the axis, resulting in the pressure roller having a "bow tie" or "hourglass" shape. This shape causes the pair of rollers to exert more pressure on the receiver sheet in the nip in the areas near the ends than in the vicinity of the roller midpoints. This gradient of pressure helps to prevent wrinkles and cockle in the receiver sheet as it passes through the nip. Over time, however, the fuser roller begins to permanently deform to conform to the shape of the pressure roller, and the gradient of pressure is reduced or lost, along with its attendant benefits. It has been found that permanent deformation, often referred to as "creep", of the base cushion layer of the fuser roller is the greatest contributor to this problem.

U.S. Pat. No. 4,372,246 discloses an externally heated fusing member whose outer layer is formed from a silicone elastomer containing dispersed iron oxide particles. In the illustrative examples, the fuser rolls were heated to a maximum surface temperature of only 270° F. (132° C.).

U.S. Pat. No. 5,208,638 discloses a perfluoroelastomer containing a dispersion of conductive material for use as an intermediate transfer surface in an electrostatic image transfer system employing liquid toners.

U.S. Pat. No. 6,061,545 discloses a heat roller that includes an internal heating element and an outer layer of fluoropolymer containing particles of a thermally conductive filler. The listing of suitable fluoropolymers in the reference includes PTFE, FEP, PFA TEFLON®, VITON®, and FLUOREL® materials.

U.S. Pat. Nos. 6,127,041 and 5,017,432 are both related to fuser members. In U.S. Pat. No. 6,127,041, the disclosed fuser member has a metallic core on which is coated a composite layer comprising a silicone T-resin, a crosslinked poly(dialkylsiloxane) incorporating an oxide, and a silane crosslinking agent. The oxide in the composite layer of the fuser member can be an oxide or a mixture of oxides, aluminum oxide, iron oxide, tin oxide, zinc oxide, copper oxide, nickel oxide, and silica being listed in the reference as typical oxides. In U.S. Pat. No. 5,017,432, the disclosed fuser member has a fusing surface that comprises VITON GF®, poly(vinylidene fluoride-hexafluoropropylene-tetrafluoroethylene), that has been cured with a nucleophilic curing agent.

External heater rollers for nip-forming rollers such as the DigiSource 911™ fusing apparatus are internally heated. These types of rollers usually have either an anodized surface layer or a TEFLON® surface layer with very low thermal resistance. The thinness of these layers does not allow a large contact length when a nip is formed with a fuser roller. A longer nip would allow more heating time for the fusing surface. To achieve this, an elastomer layer thicker than the anodized or TEFLON® surface layer could be applied to the heater roller. However, it would create a time delay for the heat energy to reach the heated roller surface due to the increase in thermal resistance that results from increased thickness of the elastomer layer. This time delay would increase thermal response time when altering the fuser roller temperature for any process reason and could preclude the use of gloss control through fuser roller temperature changes. Various receiver types have different thermal properties that affect gloss and fusion quality. Having the ability to change the fuser roller surface temperature within the time between consecutive receivers allows fusion and glossing to be tuned within a document run to receivers that are of different types, without reducing the productivity of the entire electrophotographic system.

Using radiant external surface heaters in sheet-fed processes presents the potential fire hazard of paper ignition. Radiant energy from a radiant external heater is not instantly dissipate when power is discontinued. The radiant surface will emit enough radiant energy to ignite a cellulose-base receiver such as paper if it has stalled under the radiant heater or wrapped around the fuser roller. The Xeikon DCP-32 color printer uses radiant heaters to heat its glossing rollers (GEM), allowing changes in the glossing rollers surface temperatures so that each receiver type will have consistent image gloss or quality. Although a web of paper rather than individual sheets is employed, there is still a substantial fire hazard if a safety system is not used. The Xeikon printer is provide with a safety system in the form of a clamshell that houses the radiant heat sources and closes if there are any jams that completely stop the machine. Closing of the clamshell isolates the radiant heat sources, preventing residual radiation from contacting the paper. Surrounding the clamshell is an enclosure housing comprising a nearly airtight insulated box, which greatly reduces the flow of air into the housing. The lack of oxygen would cause flames from a sheet of paper that had ignited in the radiant fusing system enclosure to die out quickly.

SUMMARY OF THE INVENTION

The present invention is directed a heater roller assembly for use with a fuser apparatus that comprises: a housing comprising a radiation shield enclosing a radiant heat source, and a heater roller that is disposed within the housing and is externally heated by the radiant heat source. The heater roller comprises: a core, a base cushion layer overlying the core, and an outer layer overlying the base cushion layer.

The outer layer of the heater roller comprises a fluorocarbon random copolymer having subunits of

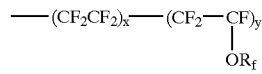

wherein x is from 10 to 90 mole %, y is from 10 to 90 mole %, x+y equal 100 mole %, and $OR_f$ is a perfluoroalkoxy group.

The present invention is further directed to a fuser apparatus that comprises a fuser roller whose outer surface is in contact with the outer layer of the heater roller included in the above described heater roller assembly. The fuser apparatus can further include a pressure roller that forms a nip with the fuser roller. In one embodiment of the apparatus of the invention, the pressure roller comprises a second fuser roller in contact with the outer layer of a heater roller of a second heater roller assembly.

Having the ability to quickly change the externally heated fuser roller surface temperature in accordance with the present invention allows for improved convenience in gloss control and thermal droop management The external radiant heating feature also allow, internal components to remain cooler than in an internally heated system, potentially resulting in increased component life.

An advantage of the present invention is that choosing a material such as a fluorocarbon random copolymer for the outer layer of the externally heated roller allows a large temperature gradient to be formed between the fuser roller and the heated roller, thereby maximizing heating time, or dwell time. Another advantage of the present invention is that the foam base cushion allows for compression to form a large pressure nip having virtually no velocity overdrive.

DETAILED DESCRIPTION OF THE INVENTION

As provided by the present invention, direct heating of the heater roller surface allows surface temperatures to be changed in order to alter a fusing process within consecutive sheets. This can be accomplished by use of an externally heated roller to impart thermal energy to a fuser roller through conduction or by direct contact. The heater roller is heated by an external radiant heat source, by which radiant energy is imparted directly to the roller surface rather than indirectly through a roller core and elastomer layer, as in an internally heated fuser roller. The externally heated roller preferably includes an elastomer layer to increase nip length with the fuser roller, resulting in increased contact length and heating time.

Figure 1:
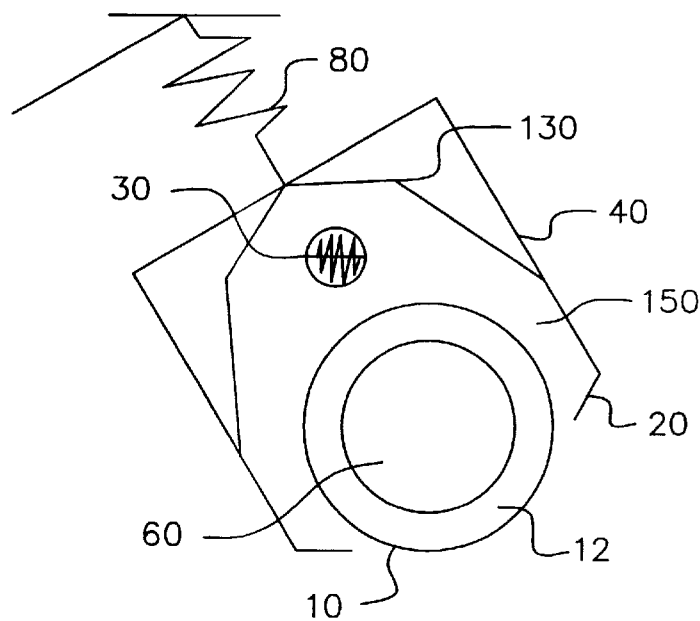
FIG. 1 is a cross-sectional view of a heater roller assembly of the present invention.

Referring to FIG. 1, a heater roller assembly 40 includes a housing 20 that comprises a radiation shield and encloses a heater roller 150 provided with supporting structures and bearings (not shown), along with a radiant heat source, preferably a quartz tube lamp 30, for externally heating roller 150. Heater roller assembly 40 optionally includes a reflector 130, which may be elliptical or parabolic, disposed within housing 20 and a loading system 80 for controlling nip pressure between heater roller 150 and a fuser roller (90 in FIG. 3).

Quartz tube lamp 30 emits infrared energy that is evenly distributed across the heater roller 150 and is easily absorbed by outer layer 10 and, further, has low thermal mass for quick heat-up and cool-down. Other useful infrared radiant heat sources include, for example, ceramic panels and electrically resistive metal rods and bars.

Figure 3:
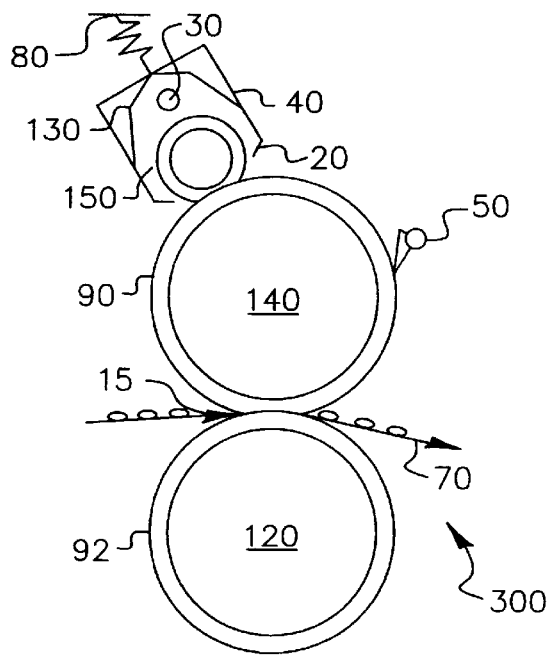
FIG. 3 is a schematic front cross-sectional view of a fuser apparatus containing a heater roller assembly in accordance with the present invention.

Heater roller 150 of FIG. 1 includes a core 60 formed from ceramic, metal, or combinations thereof, a base cushion layer 20, preferably formed of an elastomer foam for compliance to generate a large pressure nip, and an outer layer 10 that should have the highest possible thermal conductivity to minimize the time for transferring heat from roller 150 to a fuser roller (90 in FIG. 3). Layers 10 and 20 should each having a thickness of about 1 mil to about 250 mils, with base cushion layer 20 preferably having a thickness greater than that of outer layer 10.

Base cushion layer 20, which preferably is formed from a VITON® foam elastomer, allows the formation of a pressure nip of a length sufficient to provide adequate heating time, with little to no velocity overdrive due to compressibility of the foam. Thin outer layer 10 preferably is formed from a fluorocarbon random copolymer containing a thermally conductive particulate filler. Top layer 10 preferably is non-porous and smooth to provide maximum thermal contact area and cleaning convenience and, further, should not disturb the smooth layer of oil on the fuser roller to avoid oiling image artifact patterns. Furthermore, the fluorocarbon random copolymer comprising outer layer 10 should be able to withstand continuous operating temperatures of at least about 210° C. and a maximum temperature of about 350° C. This operating temperature range would allow the heater roller surface to be heated to 300° C., which is 67° C. higher than is employed in the DigiSource 9110™ apparatus. Top layer 10, whose thermal conductivity is desirably much higher than that of the relatively thermally insulating cushion layer 20, is able to transfer its heat rapidly to a fuser roller. This balance of thermal conductivity allows heat to be stored most efficiently in outer layer 10.

Figure 2:
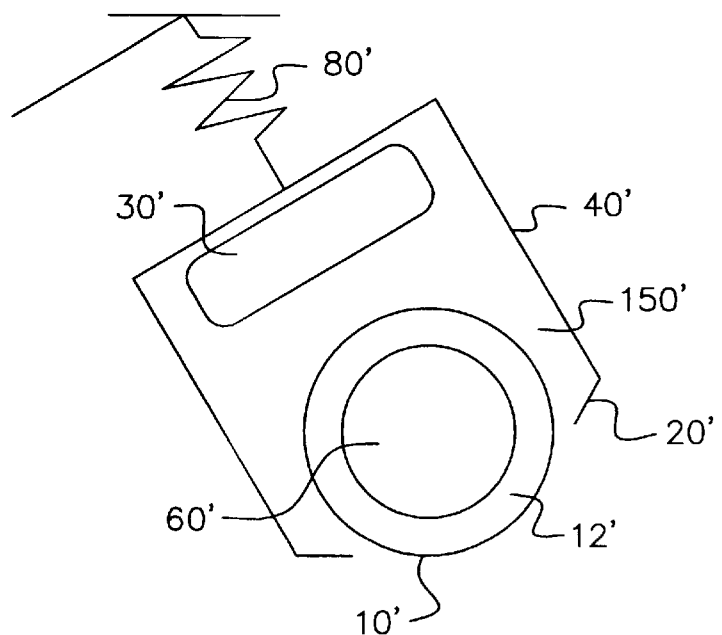
FIG. 2 is a cross-sectional view of an alternative configuration of a heater roller assembly of the invention.

FIG. 2 is a cross-sectional view of an alternative heater roller assembly 40' in accordance with the present invention. Assembly 40' differs from assembly 40 of FIG. 1 primarily in that it utilizes a ceramic panel 30' as a radiant heat source and lacks a radiation reflector.

FIG. 3 is a schematic front cross-sectional view of a simplex fuser apparatus 300 containing a heater roller assembly 40 in accordance with the present invention. Fuser apparatus 300 further comprises a fuser roller 90 in contact with heater roller 150 of roller assembly 40 and a pressure roller 92 that forms a nip 15 with fuser roller 90. Apparatus 300 optionally includes a finger skive 50 that contacts fuser roller 90 prior to its contact with heater roller 150 to provide a useful redundant safety feature. Skive 50 operates to peel off a paper sheet 70 in the unlikely event that it fails to release from fuser roller 90, thereby further reducing the probability of paper sheet 70 contacting heater roller 150. Thus, the probability of ignition of a paper sheet 70 caught between heater roller 150 and fuser roller 90 is extremely unlikely.

Figure 4:
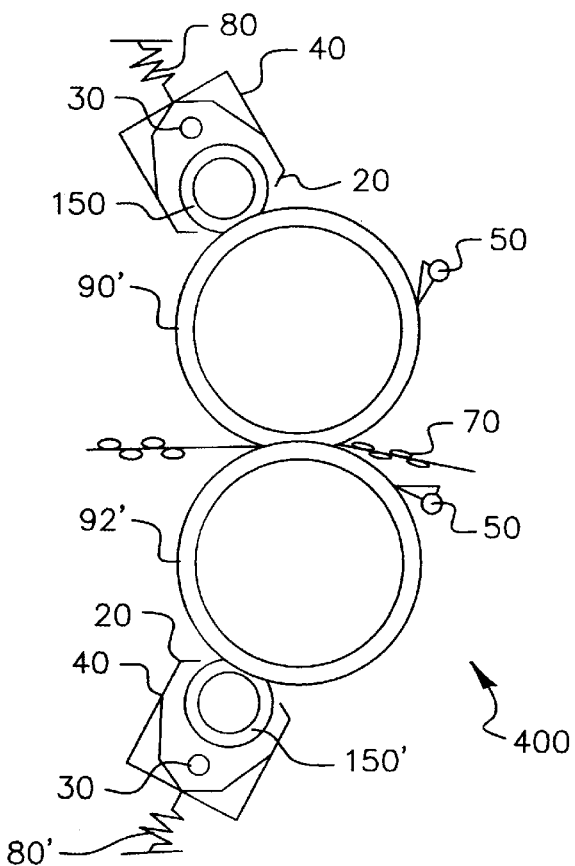
FIG. 4 is a schematic front cross-sectional view of a duplex fuser apparatus containing two heater roller assemblies in accordance with the present invention.

Single-pass duplex roller fusers were used in Kodak's EKTAPRINT 250™, EKTAPRINT 300™, and EKTAPRINT 3100™ copier/duplicators. FIG. 4 schematically depicts a single-pass duplex fuser apparatus 400 that includes fuser roller 90' and a fuser pressure roller 92', which form a nip for duplex printing of a paper sheet 70. Each of rollers 90' and 92' is optionally provided with a finger skive 50 as further safeguards against paper ignition.

Single-pass duplex roller fuser preferred apparatus preferably has a thicker base cushion layer on fuser roller 90' as opposed to the fuser pressure roller 92'. This arrangement causes the sheet 70 to exit the nip in a direction towards fuser pressure roller 92'. Having cushion layers of different thickness on rollers 90' and 92' creates different thermal resistances for each roller, resulting in differing rates of heat absorption for rollers 90' and 92' would absorb heat at different rates. To compensate for these different heating rates, the external heater rollers 150 and 150' can be loaded differently to create different sized pressure nips, resulting in differences in heating time that compensate for the different cushion layer thicknesses on each of rollers 90' and 92'.

Fluorocarbon random copolymers suitable for forming outer layer 10 of heater roller 150 in accordance with the present invention are commercially available. In particular, a series of copolymers of tetrafluorethylene with perfluoro (methyl vinyl ether) are available from DuPont under the trade name KALREZ®. These perfluoroelastomers are characterized by high thermal stability, formulated to provide maximum operating, or service, temperatures ranging from about 425° F. to 600° F. (218° C. to 316° C.).

Other fluorocarbon random copolymers useful for the practice of the present invention include perfluoro(propyl vinyl ether), another representative of a perfluoroalkoxy (PFA) copolymer available from DuPont.

The fluorocarbon random copolymers comprising the heater roller outer layer in accordance with the present invention do not contain cure sites for cross linking. Cure sites can, however, optionally be introduced by inclusion of a third monomer such as, for example, perfluoro(2-phenoxypropyl vinyl ether) and perfluoro(2-cyanopropyl vinyl ether). Other materials such as particulate fillers can also be added to attain desired mechanical and thermal properties.

To form an outer layer, filler particles can be mixed with the uncured polymer, a crosslinkable monomer, a crosslinking agent, and other additives, such as an accelerator. The resulting mixture is shaped over the base cushion layer, and cured by, for example, crosslinking with a basic nucleophile. Cure systems utilizing basic nucleophiles are well known in the art and are discussed, for example, in U.S. Pat. No. 4,272,179. One such cure system combines a bisphenol compound as the crosslinking agent and an organophosphonium salt as an accelerator.

The crosslinker is incorporated into the polymer as cure-site subunits, for example, bisphenolic residues. Other examples of nucleophilic addition cure systems are available commercially from DuPont under the trade names DIAK® No. 1 (hexamethylenediamine carbamate) and DIAK® No. 3 (N,N'-dicinnamylidene-1,6-hexanediamine).

The fillers optionally included in the outer layer containing the fluorocarbon random copolymer preferably comprise tin oxide or aluminum oxide. An additional particulate material selected from silicone carbide or alkali metal oxides, alkali metal hydroxides, and combinations of alkali metal oxides and hydroxides can also be included. Preferred additional particulate materials are selected from the group consisting of silicon carbide, magnesium oxide, calcium hydroxide, and mixtures thereof.

The particulate filler has a total concentration from about 10 to 140 parts based on a total of 100 parts of the fluorocarbon random copolymer. Concentrations of particulate filler of less than 10 parts per 100 parts of fluorocarbon random copolymer may not provide the degree of stability desired to the layer.

The tin oxide or aluminum oxide particles employed as filler in the base cushion layer of a fuser member of the invention can be obtained from any convenient commercial source, for example, Magnesium Electron, Inc. of Flemington, N.J. Useful particle diameters for the metal oxide filler does not range from about 0.1 micron to about 100 microns, preferably from about 1 micron to about 40 microns.

In a preferred embodiment of the invention, the fluorocarbon random copolymer comprising the top layer of the heater roller has a number average molecular weight in the range of about 100,000 to 200,000.

The following table further defines and describes the outer layer of heater roller and illustrates preferred embodiments of the present invention.

TABLE I

Upper Service Limit Provided by Various KALREZ ® Formulations

| Outer Layer Material | Temperature Limit | Usefullness According to Present Invention |
|---|---|---|
| KALREZ ® 4079 | 316° C. (600° F.) | Good |
| KALREZ ® 3018 | 316° C. (600° F.) | Good |
| KALREZ ® 1050LF | 290° C. (550° F.) | Good |
| KALREZ ® 2035 | 218° C. (425° F.) | Adequate |
| KALREZ ® 2037 | 218° C. (425° F.) | Adequate |
| B.F. Goodrich HYCAR ® Nitrile Rubber | 107° C. (225° F.) | Inadequate |
| Emerson-Cumming S5100 Silicone Rubber | 204° C. (400° F.) | Inadequate |
| Dow Corning SILISTIC ® HGS-70 Fluorosilicone Rubber | 190° C. (375° F.) | Inadequate |
| DuPont VITON ® A Fluoroelastomer | 204° C. (400° F.) | Inadequate |

The entries in Table 1 above show that polymers suitable for formation of the outer layer of the externally heated core of the present invention have an upper service limit, or maximum operating temperature of at least about 425° F. (218° C.), preferably about 550° F. (290° C.) to about 600° F. (316° C.). This characteristic enables the outer layer of the heater roller of the present invention to operate at much higher surface temperature than that of the externally heated fuser member discussed in the previously mentioned U.S. Pat. No. 4,372,246.

The present invention provides substantial advantages over the prior art, where various materials such as, for example, nitrile, silicone, and fluorosilicone rubbers were employed to form the outer layers of heater rollers. In contrast to the internally heated roller described in the previously mentioned U.S. Pat. No. 6,061,545, the external heating of the heater roller of the invention allows very rapid adjustment of the heater roller surface temperature and virtually instantaneous temperature response (the time needed to pass through the heating pressure nip) of the fuser roller surface. Thermal droop can be minimized, if not eliminated, without artificial cooling to increase temperature gradients. Gloss control becomes possible through fuser roller surface 90 temperature response between consecutive sheets.

The heater roller of the present invention allows a nip larger than that of the DigiSource 9110™ heater rollers. Allowing more nip time enables high volume (or high speed) heating of the fuser roller surface without thermal droop. The foam base cushion allows for compression to form a large nip. The foam base cushion layer of the heater roller of the present invention also allows for a pressure nip with virtually no velocity overdrive. This reduces relative motion in the nip, therefore reducing fuser roller surface wear.

External heating of the heater roller allows other components to operate at cooler temperatures, serving to increase reliability by increasing life, or to reduce cost by the use of components with lower temperature stability requirements than those employed in internally heated systems.

More than one heater roller subsystem can be used to increase the heating rate. Base cushion thickness is limited by mechanical strain, not by heat transfer rates. Thicker base cushions, as compared to those used in internally heated systems, can be used to form large pressure nips for obtaining extended heating, or dwell, times. Extended heating nip lengths can be used to increase fusing speed, thus increasing the productivity of a system. Alternatively, the size of the core of the heater roller of the present invention can be decreased to reduce the overall space requirements of the system.

The heater roller is mainly described herein in terms of embodiments in which the heater roller is a roll having a core, a VITON® foam base cushion layer overlying the core, and a KALREZ® fluorocarbon random copolymer outer layer disposed on the base cushion layer. The present invention is, however, not limited to a roller, nor to a fuser member having a core bearing two layers, namely, the base cushion layer and the outer layer. The fuser member can have a variety of other configurations and layer arrangements known to those skilled in the art. For example, the base cushion layer could be eliminated, or the outer layer described herein could be overlaid by one or more additional layers.

The invention has been described in detail with particular reference to certain preferred embodiments thereof, but it will be understood that variations and modifications can be effected within the spirit and scope of the invention, which is defined by the following claims.

What is claimed is:

1. A heater roller assembly for use with a fuser apparatus, said assembly comprising:
   a housing comprising a radiation shield;
   a radiant heat source disposed within said housing;
   a heater roller disposed within said housing and externally heated by said radiant heat source, said heater roller comprising:
      a core;
      a base cushion layer overlying said core; and
      an outer layer overlying said base cushion layer, said outer layer comprising a fluorocarbon random copolymer having subunits of

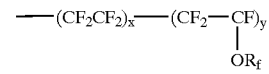

wherein x is from 10 to 90 mole %, y is from 10 to 90 mole %, x+y equal 100 mole %, and $OR_f$ is a perfluoroalkoxy group.

2. The heater roller assembly of claim 1 further comprising a reflector disposed within said housing.

3. The heater roller assembly of claim 1 further comprising a loading system for controlling nip pressure between said heater roller and a fuser member.

4. The heater roller assembly of claim 1 wherein said radiant heat source comprises a quartz tube lamp.

5. The heater roller assembly of claim 1 wherein said radiant heat source comprises a ceramic panel.

6. The heater roller assembly of claim 1 wherein said core is formed from a metallic or a ceramic material, or combinations thereof.

7. The heater roller assembly of claim 1 wherein said base cushion layer comprises a fluoroelastomer foam.

8. The heater roller assembly of claim 1 wherein $OR_f$ comprises a perfluoromethoxy group.

9. The heater roller assembly of claim 1 wherein said outer layer further comprises a particulate filler.

10. The heater roller assembly of claim 9 wherein said particulate filler comprises a metal oxide.

11. The heater roller assembly of claim 10 wherein said metal oxide is aluminum oxide or tin oxide.

12. The heater roller assembly of claim 10 wherein said metal oxide is present in said outer layer in an amount from 10 to 140 parts based on 100 parts of fluorocarbon random copolymer.

13. The heater roller assembly of claim 10 wherein said metal oxide has a particle size diameter of from about 0.1 micron to about 100 microns.

14. The heater roller assembly of claim 13 wherein said metal oxide has a particle size diameter of from about 1 micron to about 40 microns.

15. The heater roller assembly of claim 9 wherein said outer layer further comprises an additional particulate material selected from the group consisting of silicon carbide, alkali metal oxides, alkali metal hydroxides, and combinations thereof.

16. The heater roller assembly of claim 5 wherein said additional particulate material is selected from the group consisting of silicon carbide, magnesium oxide, calcium hydroxide, and mixtures thereof.

17. The heater roller assembly of claim 1 wherein said outer layer further comprises a crosslinkable monomer and a crosslinking agent.

18. The heater roll assembly of claim 1 wherein said fluorocarbon random copolymer has a number average molecular weight in the range of about 100,000 to 200,000.

19. The heater roll assembly of claim 1 wherein said fluorocarbon random polymer enables said outer layer of said heater roller to operate at a maximum surface temperature of at least about 425° F. (218° C.).

20. The heater roll assembly of claim 19 wherein said fluorocarbon random polymer enables said outer layer of said heater roller to operate at a maximum surface temperature of about 550° F. (290° C.) to about 600° F. (316° C.).

21. A fuser apparatus comprising
a first fuser roller; and
a first heater roller assembly comprising:
    a housing comprising a radiation shield;
    a radiant heat source disposed within said housing;
    a heater roller disposed within said housing and externally heated by said radiant heat source, said heater roller comprising:
        a core;
        a base cushion layer overlying said core; and
        an outer layer overlying said base cushion layer, said outer layer being in contact with an outer surface of said first fuser roller and comprising a fluorocarbon random copolymer having subunits of

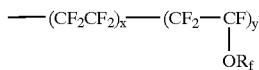

wherein x is from 10 to 90 mole %, y is from 10 to 90 mole %, x+y equal 100 mole %, and $OR_f$ is a perfluoroalkoxy group.

22. The fuser apparatus of claim 21 further comprising a pressure roller forming a nip with said fuser roller.

23. The fuser apparatus of claim 21 wherein said pressure roller comprises a second fuser roller.

24. The fuser apparatus of claim 23 further comprising a second heater roller assembly comprising:
a housing comprising a radiation shield;
a radiant heat source disposed within said housing;
a heater roller disposed within said housing and externally heated by said radiant heat source, said heater roller comprising:
    a core;
    a base cushion layer overlying said core; and
    an outer layer overlying said base cushion layer, said outer layer being in contact with an outer surface of said second fuser roller and comprising a fluorocarbon random copolymer having subunits of

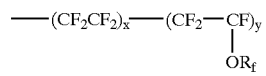

wherein x is from 10 to 90 mole %, y is from 10 to 90 mole %, x+y equal 100 mole %, and $OR_f$ is a perfluoroalkoxy group.

25. The fuser apparatus of claim 21 further comprising a first finger skive in contact with said outer surface of said first fuser roller.

26. The fuser apparatus of claim 24 further comprising a second finger skive in contact with said outer surface of said second fuser roller.

27. The fuser apparatus of claim 21 wherein said first heater roller assembly further comprises a reflector disposed within said housing.

28. The fuser apparatus of claim 21 wherein said first heater roller assembly further comprises a loading system for controlling nip pressure between said first heater roller and said first fuser roller.

29. The fuser apparatus of claim 21 wherein said radiant heat source in said first heater roller assembly comprises a quartz tube lamp.

30. The fuser apparatus of claim 21 wherein said core of said heater roller is formed from a metallic or a ceramic material, or combinations thereof, and said base cushion layer of said heater roller comprises a fluoroelastomer foam.

31. The fuser of claim 21 wherein $OR_f$ comprises a perfluoromethoxy group.

32. The fuser apparatus of claim 21 wherein said outer layer of said heater roller further comprises a metal oxide particulate filler.

33. The fuser apparatus of claim 21 wherein said outer layer of said heater roller further comprises an additional particulate material selected from the group consisting of silicon carbide, alkali metal oxides, alkali metal hydroxides, and combinations thereof.

34. The fuser apparatus of claim 21 wherein said fluorocarbon random polymer enables said outer layer of said heater roller to operate at a maximum surface temperature of at least about 425° F. (218° C.).

35. The fuser apparatus of claim 34 wherein said fluorocarbon random polymer enables said outer layer of said heater roller to operate at a maximum surface temperature of about 550° F. (290° C.) to about 600° F. (316° C.).

* * * * *